No. 713,502. Patented Nov. 11, 1902.
H. SARGENT.
ANIMAL TRAP.
(Application filed May 7, 1902.)
(No Model.)

WITNESSES:

INVENTOR
Harvey Sargent
BY
ATTORNEYS.

UNITED STATES PATENT OFFICE.

HARVEY SARGENT, OF CORVALLIS, OREGON.

ANIMAL-TRAP.

SPECIFICATION forming part of Letters Patent No. 713,502, dated November 11, 1902.

Application filed May 7, 1902. Serial No. 106,285. (No model.)

*To all whom it may concern:*

Be it known that I, HARVEY SARGENT, a citizen of the United States, and a resident of Corvallis, in the county of Benton and State of Oregon, have invented new and useful Improvements in Animal-Traps, of which the following is a full, clear, and exact description.

My invention relates to improvements in traps for the extermination of different kinds of animals, such as burrowing animals, like gophers and moles, and other animals, like dogs, cats, coons, and skunks, or even the larger wild animals.
One object that I have in view is to equip the trap with a simple, efficient, and cheap style of firearm adapted for service in connection with fixed ammunition, which may be automatically discharged or exploded so as to kill the animal.

A further object is to equip the trap with a novel tripping mechanism which may be operated by the pushing movement of burrowing animals or by the pull of other kinds of animals in the effort to dislodge bait from an element of the tripping mechanism.

With these ends in view the invention consists in the novel construction and arrangement of parts, which will be hereinafter fully described and claimed.

Figure 1:
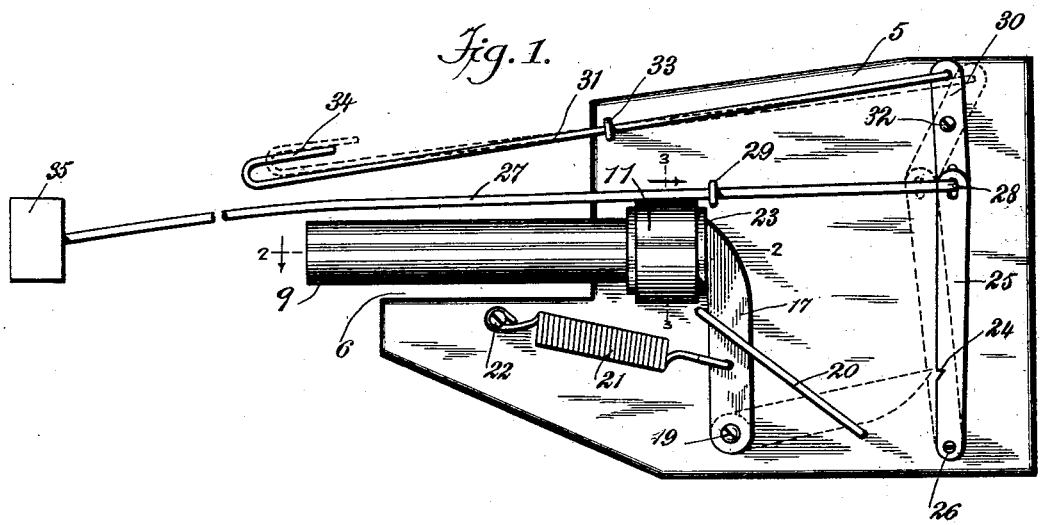
Figure 2:
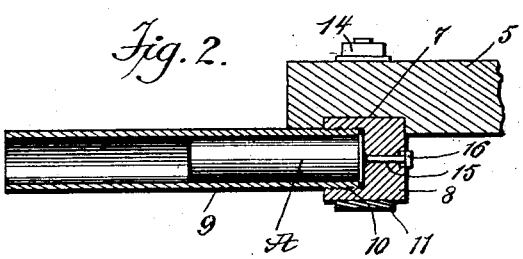
Figures 3, 4:
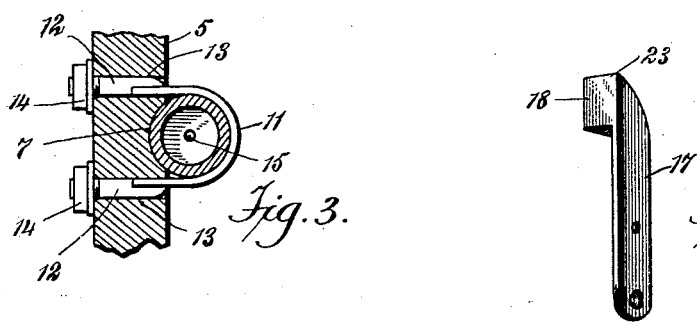

Reference is to be had to the accompanying drawings, forming a part of this specification, in which similar characters of reference indicate corresponding parts in all the figures.
Figure 1 is a side elevation of an animal-trap embodying my improvements. Fig. 2 is a horizontal sectional plan view through a part of the trap in the plane of the dotted line 2 2 of Fig. 1 and having a cartridge in position in the barrel of the firearm. Fig. 3 is a vertical transverse section taken in the plane indicated in the dotted line 3 3 of Fig. 1, and Fig. 4 is a detail perspective view of the hammer removed from the trap.
The frame which supports the operating parts of my improved trap is preferably embodied in the form of a flat plate or block 5, which is recessed or cut away at one corner thereof at 6 in Fig. 1, and in the face of this frame block or plate is produced or formed a short groove 7, as indicated by Figs. 2 and 3, said groove being adapted to extend or open into the recess 6. The groove 7 is adapted to receive a part of the firearm, which is mounted on the frame-block, so as to form an integral part of the trap, and this firearm may be of any suitable or desired construction. In the embodiment of the invention shown by the drawings the firearm consists of a breech 8 and a barrel 9, said parts being separably coupled together by means of the screw-threaded joint. (Indicated more clearly in Fig. 2 at 10.) The breech is fitted snugly in the groove 7, so as to be practically embraced by the face of the frame block or plate 5, and said breech is held or confined in place by the action of a clamping-strip 11, the latter having the threaded legs 12, which pass through suitable openings 13 in the frame block or plate 5, so as to receive the clamping-nuts 14, (see Fig. 3,) whereby the breech is attached solidly to the frame-block. The breech is furthermore provided with an axial opening 15, adapted to receive the firing-pin, which is indicated at 16, the latter being of any suitable form—as, for example, a nail or other like device. The threaded joint between the breech and the barrel is formed by the provision of a female threaded socket in the breech and by a male thread on the rear end of the barrel, thus detachably fastening said barrel to the breech. The barrel may be unscrewed from the breech in order to introduce a cartridge therein, as indicated at A in Fig. 2, and after the cartridge shall have been inserted in the barrel so that its rim will impinge the end face of the barrel the latter is replaced by screwing its threaded end into the socket of the breech, whereby the barrel and the breech are adapted to coöperate in holding the cartridge in the path of the firing-pin 16. The barrel 9 may be of any suitable length, and it is adapted to extend across the recess 6 and beyond the end of the frame-plate, as shown more clearly by Fig. 1.

17 designates the hammer, which is provided at one end with an enlargement forming a head 18, and this hammer is pivoted at 19 to the said frame-block, the hammer occupying a position wherein its head 18 is adapted to forcibly strike the firing-pin 16. The hammer is adapted to swing or play in a guide formed by a rod 20, which is attached to the frame-block, and to said hammer is connected one end of a coiled spring 21, the latter being fastened by a screw 22 to the frame-block. The headed end of the hammer is tapered or pointed, so as to form a nose 23, which is adapted to engage with a notch 24, that is formed in one edge of a setting-lever 25, the latter being disposed in rear of the firing mechanism and fulcrumed, as at 26, to the frame-block. This setting-lever has suitable tripping or releasing devices associated therewith, and one releasing device is in the form of a push-rod 27, the latter being loosely connected, as at 28, to the otherwise unconfined end of the setting-lever, and said push-rod is arranged to play in a guide 29, attached to the frame-block in order to hold the push-rod in operative relation to the frame-block and the lever.

If desired, other tripping devices adapted to be operated by a pull may be connected with the setting-lever, and in Fig. 1 these pull-operated devices are shown in the form of an auxiliary lever 30 and a pull-rod 31. This auxiliary lever is fulcrumed at a point intermediate of its length, as at 32, to the frame-block, and the lower part of this lever is connected with the setting-lever 25 at the point 28. To the other arm of the auxiliary lever is loosely connected the rear end of the pull-rod 31, which is guided on the base-block by an eye or staple 33, and the free end of this pull-rod 31 is formed or provided with a bait-holder, the same being indicated as a hook 34, which is made by bending the rod upon itself.

In operation the barrel 9 is unscrewed from the breech, a cartridge is placed in the barrel, and the latter is replaced by screwing it into the socket of the breech. If the trap is used for killing burrowing animals, such as gophers and moles, the mound of earth is excavated sufficiently to permit of the introduction of the trap, the barrel 9 of which is set in line with the burrow. The push-rod 27 also lies in line with the burrow and above the barrel, and the hammer 17 is drawn back, so that it will engage with the notched setting-lever 25. Previous to cocking the firing mechanism a push block or plate 35 is placed in the burrow against the end of the push-rod 27, and the trap having been set and placed in position the earth is replaced, so as to bury and conceal the trap, sufficient space being left around the hammer 17 for free operation thereof. When the animal traverses the burrow and pushes against the block 35, the rod 27 is forced in a rearward direction, and the lever 25 is moved so as to disengage its notched portion from the nose of the hammer, whereupon the spring 21 becomes active and forcibly impels the hammer against the firing-pin 16. The cartridge is thus exploded, and the charge thereof is driven into the animal.

In case it is desired to use the trap for the destruction of other animals which will be enticed by the employment of a suitable bait the rod 31 is adapted to serve as the means for releasing the setting-lever by a pulling action. The bait is placed on the holder 34 and the animal in its efforts to detach the bait will pull the rod 31 so as to actuate the lever 30 and move the setting-lever 25 to a position free from engagement with the spring-actuated hammer, thereby exploding the cartridge.

Having thus described my invention, I claim as new and desire to secure by Letters Patent—

1. An animal-trap comprising a suitable frame, a barrel having a breech-block secured in the frame and provided with a firing-pin, a hammer, a pivoted notched tripping-lever in the path of said hammer, a push-rod pivoted to the tripping-lever, a second lever also pivotally connected to the tripping-lever, and a pull-rod connected to the second lever, the fulcrum of the latter being located between the points of attachment to the tripping-lever and the pull-rod.

2. An animal-trap comprising a suitable frame, a breech-block having a firing-pin, a clamp embracing said breech-block and attached to said frame, a barrel screwed removably to the breech-block, a spring-actuated hammer pivoted to said frame and arranged to strike said pin, a shouldered setting-lever in the path of said hammer, a push-rod connected to said lever, a pull-rod, and another lever pivoted to the pull-rod and to said setting-lever.

In testimony whereof I have signed my name to this specification in the presence of two subscribing witnesses.

HARVEY SARGENT.

Witnesses:
S. CHIPMON,
VIRGIL E. WATTERS.